(12) United States Patent
Wang et al.

(10) Patent No.: US 8,478,059 B2
(45) Date of Patent: *Jul. 2, 2013

(54) ARBITRARY RATIO IMAGE RESIZING IN THE DCT DOMAIN

(75) Inventors: Longji Wang, Waterloo (CA); En-hui Yang, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,945

(22) Filed: Jun. 28, 2012

(65) Prior Publication Data

US 2012/0263392 A1    Oct. 18, 2012

Related U.S. Application Data

(63) Continuation of application No. 11/875,282, filed on Oct. 19, 2007, now Pat. No. 8,233,727.

(51) Int. Cl.
*G06K 9/36* (2006.01)
*G06K 9/46* (2006.01)
*G06K 9/32* (2006.01)

(52) U.S. Cl.
USPC .......................................... 382/232; 382/298

(58) Field of Classification Search
USPC ................. 382/232, 233, 235, 248, 250, 298
See application file for complete search history.

(56) References Cited

U.S. PATENT DOCUMENTS

| | | | |
|---|---|---|---|
| 5,926,573 A | 7/1999 | Kim et al. | |
| 6,807,310 B1 | 10/2004 | Dugad et al. | |
| 8,233,727 B2 * | 7/2012 | Wang et al. | 382/232 |
| 2005/0232497 A1 | 10/2005 | Yogeshwar et al. | |

FOREIGN PATENT DOCUMENTS

WO    03/056837 A1    7/2003

OTHER PUBLICATIONS

Park, "Arbitrary-Ratio Resizing Using Fast DCT of Composite Length for DCT-Based Transcoder", IEEE Trans. Image Processing, vol. 15, No. 2, Feb. 2006.
Shu et al., "An Efficient Arbitrary Downsizing Algorithm for Video Transcoding", IEEE Trans. Circuits Syst. Video Technol., vol. 14, No. 6, Jun. 2004.
Mukherjee et al., "Image Resizing in the Compressed Domain Using Subband DCT", IEEE Trans. Circuits Syst. Video Technol., vol. 12, No. 7, Jul. 2002.
Dugad et al., "A Fast Scheme for Image Size Change in the Compressed Domain", IEEE Trans. Circuits Syst. Video Technol., vol. 11, No. 4, Apr. 2001.

(Continued)

*Primary Examiner* — Bernard Krasnic
(74) *Attorney, Agent, or Firm* — Rowand LLP

(57) ABSTRACT

To resize a compressed image, first and second scaling parameters P and Q are determined in accordance with the block numbers L and M and the scaling ratio L/M or M/L. A non-uniform, or uneven, sampling in the DCT domain is then applied to coefficients of successive blocks in the compressed image in accordance with the scaling parameters. In an embodiment, P blocks are sampled and transformed from a given block length to |P| according to a |P|-point IDCT, while Q blocks are sampled and transformed from a given block length to |Q| according to a |Q|-point IDCT. The non-uniformly sampled and transformed pixel domain samples are then regrouped into a predetermined block size and transformed back to generate the DCT coefficient of the compressed image. The proposed method significantly reduces the computational complexity compared with other DCT domain arbitrary ratio image resizing approach.

20 Claims, 8 Drawing Sheets

OTHER PUBLICATIONS

Bi et al., "DCT Algorithms for Composite Sequence Lengths", IEEE Trans. Signal Processing, vol. 46, No. 3, Mar. 1998.

Salazar et al., "On Resizing Images in the DCT Domain", 2004, International Conference on Image Processing (ICIP), IEEE, pp. 2797-2800.

Lee et al., "The type 3 nonuniform FFT and its applications", Elsevier, Journal of Computational Physics 206, available online Jan. 22, 2005, pp. 1-5.

Mukherjee et al., "Arbitrary resizing of images in DCT space", IEE Proc.-Vis Image Signal Process, vol. 152, No. 2, Apr. 2005, pp. 155-164.

Wang et al., "A Fast Scheme for Arbitrarily Resizing of Digital Image in the Compressed Domain", IEEE Transactions on Consumer Electronics, vol. 49, No. 2, May 2003, pp. 466-471.

Mukhopadhyay, "Resizing of images in the DCT Space by Arbitrary Factors", IEEE, 2004 International Conference on Image Processing (ICIP), 2004, pp. 2801-2804.

Park et al., "L/M-Fold Image Resizing in Block-DCT Domain Using Symmetric Convolution", IEEE transaction on Image Processing, vol. 12, No. 9, Sep. 2003, pp. 1016-1034.

Lee et al., "Visual Quality Enhancement in DCT-Domain Spatial Downscaling Transcoding Using Generalized DCT Decimation", IEEE Transactions on Circuits and Systems for Video Technology, vol. 17, No. 8, Aug. 2007, pp. 1079-1084.

U.S. Appl. No. 11/875,282, Notice of Allowance dated Apr. 2, 2012.

* cited by examiner

ARBITRARY RATIO IMAGE RESIZING IN THE DCT DOMAIN

CROSS-REFERENCE

This is a continuation of U.S. application Ser. No. 11/875,282 filed Oct. 19, 2007, the contents of which are incorporated herein by reference in their entirety.

FIELD OF THE INVENTION

The present invention relates generally to image or video frame compression. More particularly, the present invention relates to arbitrary ratio image resizing in the frequency domain.

BACKGROUND OF THE INVENTION

The spatial resolution of a source image or video frame is often larger than the screen size of a handheld device. Consequently, image downsizing or video transcoding with spatial resolution down-sampling is performed, typically at the server side of the service provider, to reduce the spatial resolution of the source image or video frame in order to fit the display screen of the end device. Image or video frame resizing is conventionally performed in the pixel, or spatial, domain through a low-pass filtering operation followed by a downsampling process. However, for JPEG images, and video frames formatted according to common standards, such as H.26x series standards and MPEG-x series standards, the image and video frames are already in a compressed format in the frequency domain and the resized JPEG images or video frames must be transmitted in their compressed format. Thus, spatial domain resizing of such compressed images or video frames requires that the images be fully decoded into the pixel domain, resized through low-pass filtering, downsampled, and recompressed. Though effective, this brute force approach is undesirable due to its high computational cost.

The computational complexity can be reduced by resizing the images in the frequency domain. Some of the suggested approaches use a filter matrix whose entries depend on the discrete cosine transform (DCT) basis functions. However, these approaches are only designed for resizing images by a power of 2 or a few specific ratios. In practical applications arbitrary resizing ratios are required since the spatial resolution, or the dimension of the source image, is arbitrary.

Arbitrary ratio resizing methods in the DCT domain have also been proposed. In one such method, an 8×8 downsized block is reconstructed from neighboring input blocks and corresponding shift matrices in the DCT domain. In another approach, the arbitrary ratio resizing is achieved by upsizing the image through zero padding, and then downsizing it through high-frequency DCT coefficient truncation. Both of these arbitrary ratio resizing methods in the DCT domain show good peak signal-to-noise ratio (PSNR) and lower computational complexity when compared with the spatial-domain resizing methods.

However, there are still two problems associated with these previously proposed arbitrary ratio resizing algorithms in the DCT domain. First, they are still computationally expensive. Second, both approaches are difficult to implement for practical applications. For most practical applications, such as web browsing or video game playing on handheld device, the spatial resolution of each source image varies even though the screen size of the device is fixed. Therefore, the resizing ratio is not only arbitrary, but varies from image to image as well. For each different resizing ratio, the first approach requires a large number of different matrices to be calculated and stored in advance. The second approach requires fast implementation of DCT and inverse discrete cosine transform (IDCT) operations at every possible length, which is nontrivial even though some fast implementations for composite lengths exist.

Therefore, it is desirable to provide a fast arbitrary ratio image resizing approach in the DCT domain that is not only easily implemented for practical applications, but also reduces the computational complexity as compared to previous approaches.

SUMMARY OF THE INVENTION

It is an object of the present invention to obviate or mitigate at least one disadvantage of previous image resizing methods and systems.

In a first aspect, there is provided a method for arbitrary ratio resizing of a compressed image in the discrete cosine transform (DCT) domain. The method first comprises determining first and second scaling parameters in accordance with a scaling ratio and original and target image block numbers. A non-uniform sampling in the DCT domain, in accordance with the first and second scaling parameters, is then performed on DCT coefficients of successive blocks in the compressed image, after which a DCT operation is performed on the non-uniformly sampled samples to provide DCT coefficient blocks of a resized image. The non-uniform sampling and resampling steps can be performed for each color component of the compressed image, and can be repeated for each row or column of blocks in the compressed image. The method can further comprise maintaining synchronization between components compressed at different sampling rates, maintaining consistency between the sampling ratio of components in the compressed image and the sampling ratio of components in the resized image.

According to embodiments of this aspect, determining the first and second scaling parameters can comprise determining first and second inverse discrete cosine transform (IDCT) lengths as functions of the scaling ratio and a DCT block length of the compressed image; and determining the first and second scaling parameters as functions of the DCT block length of the compressed image, original and target image block numbers, and the second IDCT length. Determining the first and second scaling parameters can comprise determining the first IDCT length that is the closest integer larger than or equal to the product of the DCT block length and the scaling ratio; determining the second IDCT length that is the closest integer smaller than or equal to the product of the DCT block length and the scaling ratio; determining the first scaling parameter according to the product of the DCT block length and the target block number less the product of the second IDCT length and the original block number; and determining the second scaling parameter according to the difference between the original block number and the first scaling parameter.

According to further embodiments, performing the non-uniform sampling in the DCT domain can comprise performing an IDCT of the first IDCT length on a number of blocks proportional to the first scaling parameter; and performing an IDCT of the second IDCT length on a number of blocks proportional to the second scaling parameter. In addition, the method can further comprise permuting performance of the IDCT at the first and second lengths according to a predetermined permutation scheme. Performing the DCT operation on the non-uniformly sampled samples can comprise regrouping the non-uniformly sampled samples into blocks of a predetermined length; and performing a DCT on each of the regrouped blocks. For example, performing the DCT operation on the non-uniformly sampled samples can comprise regrouping the non-uniformly sampled samples into 8-sample blocks; and performing an 8-point DCT on each of the regrouped blocks. The method can further comprise partially decoding the compressed image to restore the DCT coefficients. Such partial decoding of the compressed image can comprise entropy decoding the compressed image to provide quanitized coefficient indices; and dequantizing the quantized coefficient indices to restore the DCT coefficients. According to yet other embodiments, the method can further comprise quantizing the DCT coefficient blocks of the resized image; and entropy coding the quantized DCT coefficient blocks to provide a resized compressed image.

In a further aspect, there is provided a resizing transcoder for arbitrary ratio resizing of a compressed image in the DCT domain according to the present method. The transcoder comprises an entropy decoder to entropy decode components of a compressed image to provide quantized coefficient indices for each component; a dequantizer to dequantize the quantized coefficient indices to reconstitute DCT coefficients for each component; a scaling function to determine first and second IDCT lengths and first and second scaling parameters in accordance with a desired scaling ratio, and original and target image block numbers; an IDCT to perform a non-uniform sampling of the DCT coefficients of successive blocks in the compressed image, in accordance with the first and second scaling parameters, and the first and second IDCT lengths, to provide non-uniformy-sampled pixel domain samples; a resizing function to concatentate the non-uniformly sampled pixel domain samples into blocks of a predetermined size; a DCT function to transform each of the concatenated blocks to provide DCT coefficient blocks of a resized image; a quantizer to quantize the DCT coefficient blocks of the resized image; and an entropy coder to entropy code the quantized DCT coefficient blocks to provide a resized compressed image.

According to yet another aspect, there is provided a method for downsizing a compressed image in the DCT domain by an arbitrary scaling ratio of L/M, where L is a target block number and M is an original block number. The method comprises non-uniformly sampling DCT coefficients of successive blocks in the compressed image to provide non-uniformly sampled pixel domain samples, each block having an 8-point block length, by sampling P blocks at a first IDCT length |P| and sampling Q blocks at an IDCT length |Q|; where |P| and |Q| are integers between 2 and 8 that are functions of the DCT block length of the compressed image and the scaling ratio, first scaling parameter P is equal to the product of the DCT block length and the target block number L less the product of the second IDCT length |Q| and the original block number M, and second scaling parameter Q is the difference between the original block number M and the first scaling parameter P. The non-uniformly sampled pixel domain samples are then concatenated into 8-sample blocks; and an 8-point DCT is performed on each of the concatenated blocks.

According to embodiments of the method, non-uniformly sampling the DCT coefficients can comprise performing a |P|-point IDCT on P blocks; and performing a |Q|-point IDCT on Q blocks. The method can further comprise repeating the steps for each component of the compressed image, and for each row and/or column of blocks in the compressed image. Synchronization can be maintained between components compressed at different sampling rates, and consistency can be maintained between the sampling ratio of components in the compressed image and the sampling ratio of components in a resized image.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
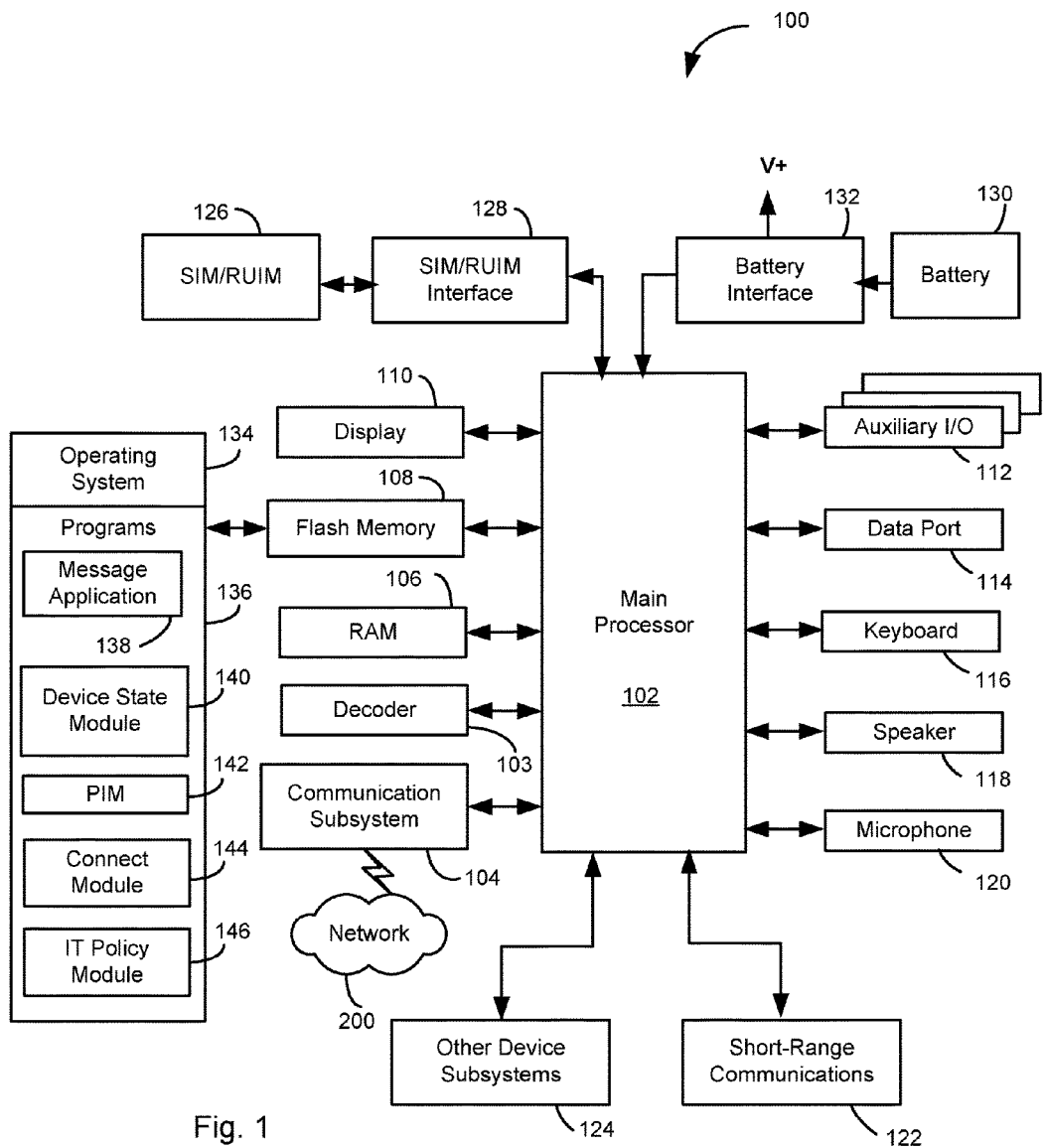
FIG. 1 is a block diagram of an embodiment of a mobile device.

Generally, there is provided a method and system for resizing images or video frames at arbitrary ratios. The term "image" is used throughout this description to refer to both still images and video frames. Embodiments of the method and system for resizing images will be described in relation to their use for mobile wireless communication to a mobile wireless communication device, hereafter referred to as a mobile device. However, the description is not to be considered as limiting the scope of the described embodiments, and they are explicitly not limited to use in mobile wireless communication. Examples of applicable mobile devices include pagers, cellular phones, cellular smart-phones, wireless organizers, personal digital assistants, computers, laptops, handheld wireless communication devices, wirelessly-enabled notebook computers and the like. Where considered appropriate, reference numerals are repeated among the figures to indicate corresponding or analogous elements. In addition, numerous specific details are set forth in order to provide a thorough understanding of the described embodiments; however, it will be understood by those of ordinary skill in the art that the described embodiments can be practiced without these specific details. Well-known methods, procedures and components are not described in detail so as not to obscure the described embodiments.

To aid in understanding the structure of the mobile device and how it communicates with other devices and host systems, reference will now be made to FIGS. 1-4, which depict an embodiment of a mobile device 100, and its associated wireless communication system. The arbitrary ratio resizing method and system can be practiced within such a system for transmission of images to the mobile device 100. The mobile device 100 is a two-way communication device with advanced data communication capabilities including the capability to communicate with other mobile devices or computer systems through a network of transceiver stations. The mobile device 100 can also have voice communication capabilities. Depending on the functionality provided by the mobile device 100, it can be referred to as a data messaging device, a two-way pager, a cellular telephone with data messaging capabilities, a wireless Internet appliance, or a data communication device (with or without telephony capabilities).

FIG. 1 is a block diagram of an exemplary embodiment of a mobile device 100. The mobile device 100 includes a number of components such as a main processor 102 that controls the overall operation of the mobile device 100. Communication functions, including data and voice communications, are performed through a communication subsystem 104. Data received by the mobile device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one exemplary implementation, other wireless networks can also be associated with the mobile device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the mobile device 100 and to personalize the mobile device 100, among other things. Without the SIM/RUIM card 126, the mobile device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells can provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages can be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an information technology (IT) policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path can, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
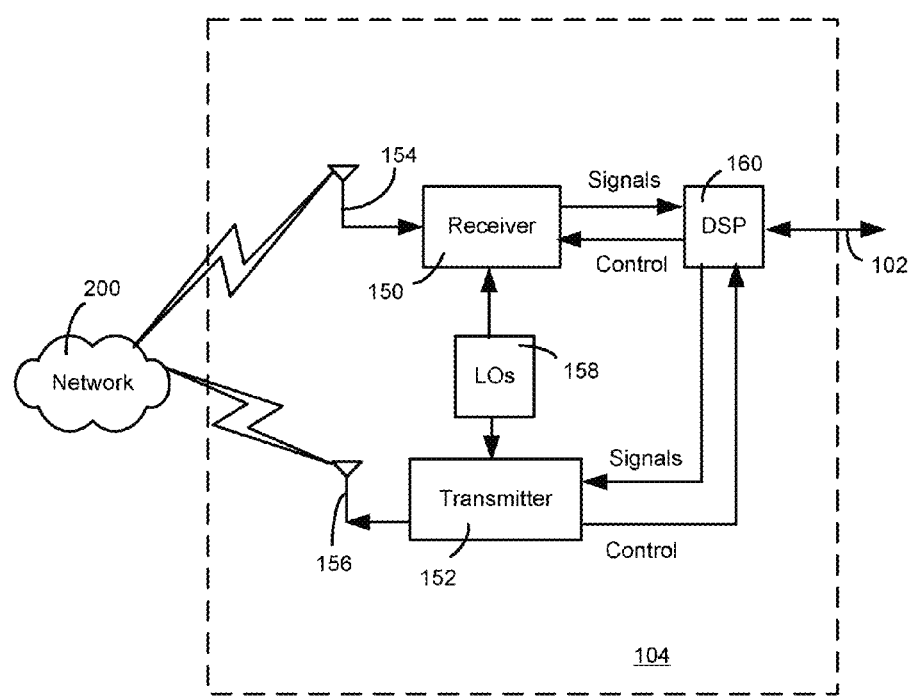
FIG. 2 is a block diagram of an embodiment of a communication subsystem component of the mobile device of FIG. 1.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that should be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
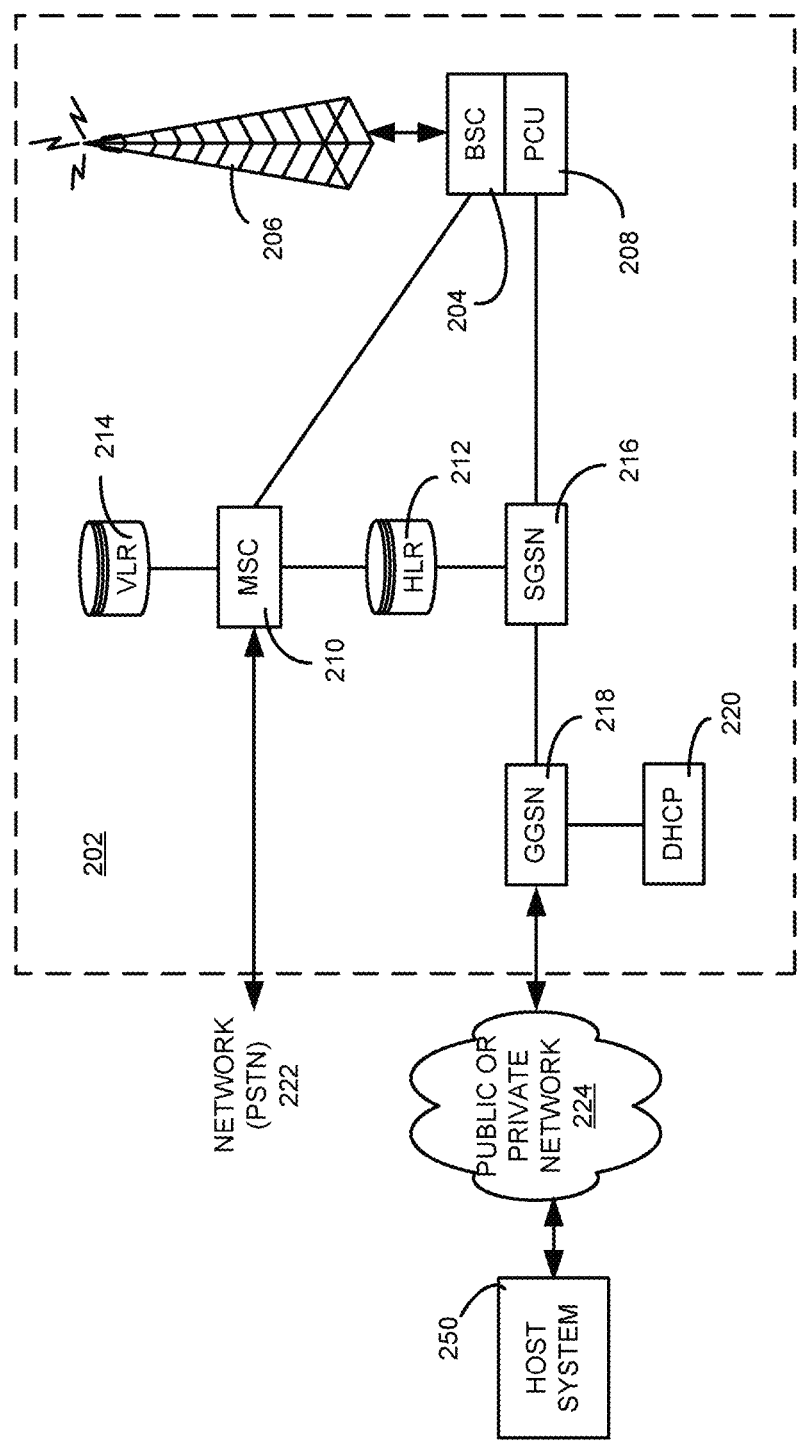
FIG. 3 is an exemplary block diagram of a node of a wireless network.

FIG. 3 is a block diagram of an exemplary implementation of a node 202 of the wireless network 200. In practice, the wireless network 200 comprises one or more nodes 202. In conjunction with the connect module 144, the mobile device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters can vary between different nodes. For example, one node can employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 4:
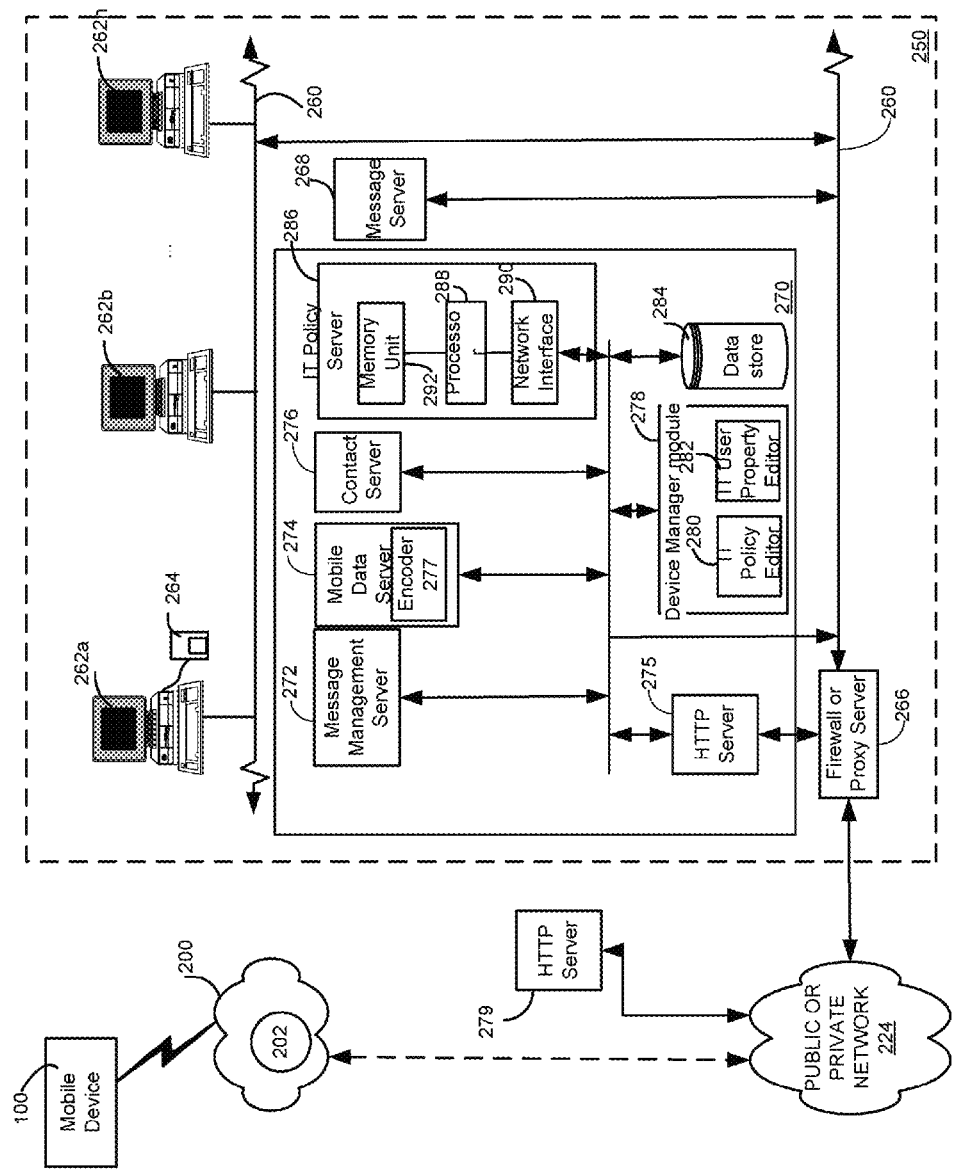
FIG. 4 is a block diagram illustrating components of a host system in one exemplary configuration for use with the wireless network of FIG. 3 and the mobile device of FIG. 1.

FIG. 4 is a block diagram illustrating components of an exemplary configuration of a host system 250 with which the mobile device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's mobile device 100 is situated on a LAN connection. The cradle 264 for the mobile device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262a to the mobile device 100, and can be particularly useful for bulk information updates often performed in initializing the mobile device 100 for use. The information downloaded to the mobile device 100 can include certificates used in the exchange of messages.

It will be understood by persons skilled in the art that the user computers 262a-262n are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the mobile devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the mobile device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages can originate from any number of sources. For instance, a message can have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262a can request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's mobile device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the mobile device 100 via the shared network infrastructure 224 and the wireless network 200. The message management server 272 can also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 can receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 can also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 can push only the first part of a message to the mobile device 100, with the part being of a pre-defined size (e.g. 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as an File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the mobile device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g. encryption algorithms, password rules, etc.), specifying themes or applications that are allowed to run on the mobile device 100, and the like.

The arbitrary ratio resizing method and system will now be described. For the purposes of explanation, a JPEG image format is assumed throughout the rest of this description. However, the described techniques are suitable to image or video frame compression using any DCT compression technique, including JPEG, MPEG-x and H.26x. For most applications, the arbitrary ratio resizing of images or video frames is accomplished at the server side, such as in a transcoder associated with encoder 277. However, the resizing can be implemented at the device side, if desired.

Figure 5:
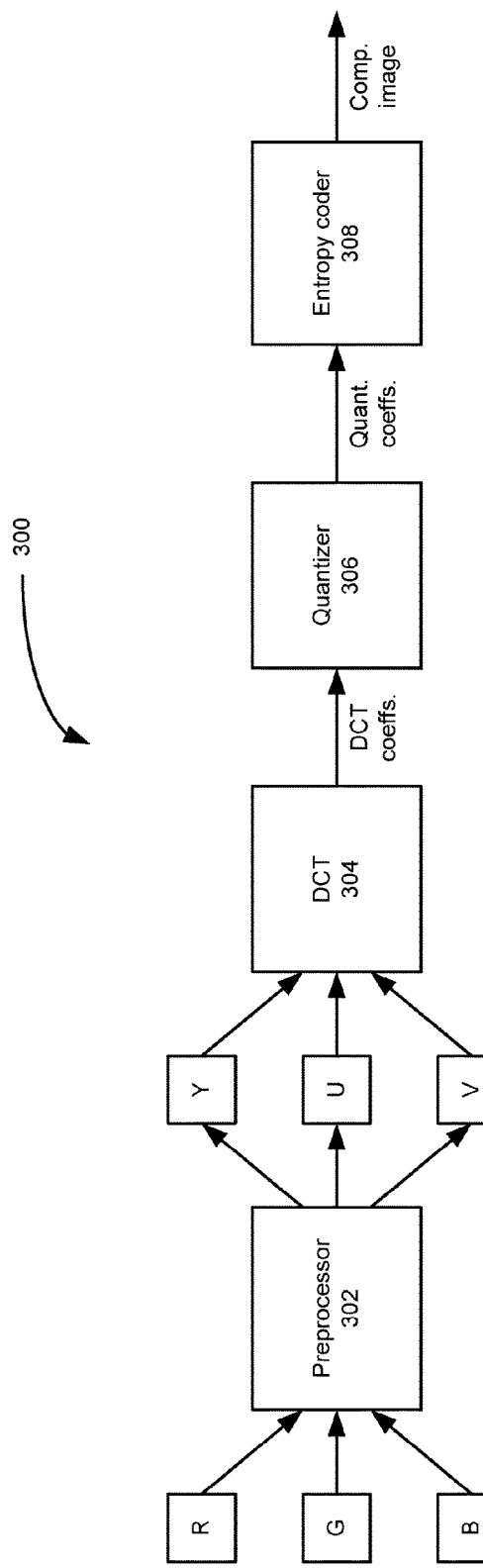
FIG. 5 is a block diagram of a JPEG transcoder.

To better understand the resizing method, JPEG compression will be generally described with reference to FIG. 5, which shows a block diagram of a typical JPEG encoder 300. A preprocessor 302 receives Red, Green, Blue (RGB) components for each pixel of the image, and optionally converts them from the RGB color space into the YUV, or other, color space. The YUV color space is used as the example color space in the rest of the description. However, the described techniques are suitable to other color spaces including gray image. The YUV color space has three components Y, U and V. The Y component represents the brightness, or luminance, of a pixel, and the U and V components represent the chrominance. The preprocessor 302 can also downsample, or chroma sample, the chrominance components to reduce the file size of the compressed image. The ratios at which the downsampling can be done in JPEG are 4:4:4 (no downsampling), 4:2:2 (reduce by factor of 2 in horizontal direction), and most commonly 4:2:0 (reduce by factor of 2 in horizontal and vertical directions). Downsampling of the chrominance components saves space taken by the image, and the resulting loss of quality is generally imperceptible to the human eye. For the rest of the compression process, the Y, U and V components are processed separately. After downsampling, each component channel is split into 8×8 blocks, if the data for a channel does not represent an integer number of blocks then the preprocessor 302 pads the incomplete blocks, as is well-known in the art.

The 8×8 blocks are then fed to the DCT block 304, which converts components to the frequency domain using a two-dimensional forward DCT. The output of the DCT is a set of DCT coefficients in the frequency domain. The first, or lowest, frequency coefficient is the DC coefficient, while the remaining coefficients are AC coefficients at progressively higher frequencies. The DCT coefficients are then quantized, at quantizer 306, by dividing each coefficient by the quantization step size for that frequency, and then rounding to the nearest integer. The quantized coefficients are then entropy coded, at entropy coder 308, using techniques such as Huffman coding or arithmetic coding, to arrive at the compressed bit stream output. Decompression of a compressed image proceeds in reverse at the decoder 103 (see FIG. 1): the components are subject to entropy decoding, dequantization, IDCT, and restoration to the RGB color space.

Figure 6:
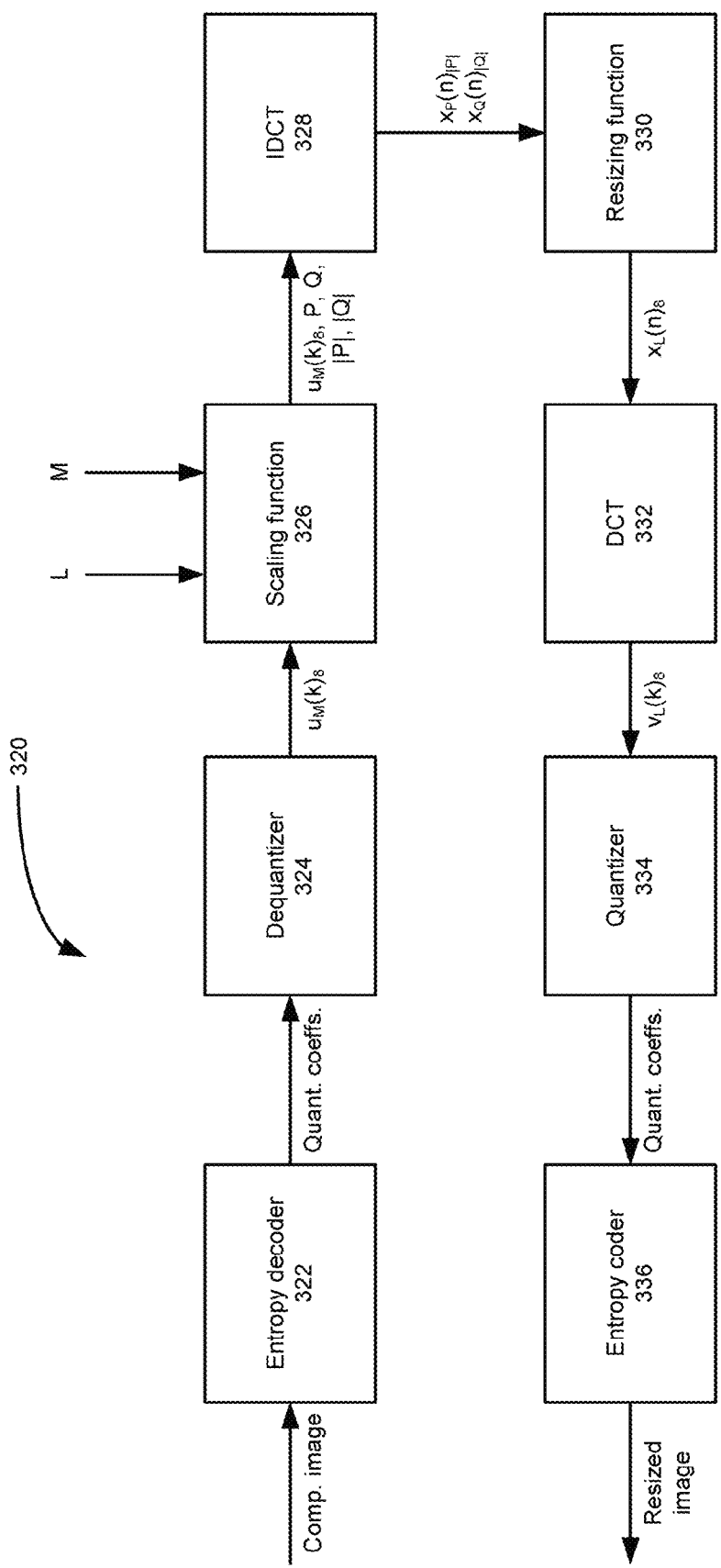
FIG. 6 is a block diagram of an embodiment of an arbitrary ratio resizing transcoder.

A resizing transcoder 320 for resizing compressed images in the DCT domain is shown in FIG. 6. The resizing transcoder 320 can be integrated into encoder 277 shown in FIG. 4, or can be implemented separately and associated with any server side element. For applications where knowledge of the device resolution is not known at the server side, or for applications where "on-the-fly" resizing is desired, the resizing transcoder 320 can be implemented in the mobile device 100. The resizing transcoder 320 and its associated method of operation provide arbitrary resizing of a compressed image in the DCT domain. First and second scaling parameters P and Q are determined in accordance with block numbers L and M and the scaling ratio L/M or M/L, depending on whether the image is being downsized or upsized. L and M are respectively the target and original image block number without a common factor greater than one (i.e., L/M is an irreducible fractional number). A non-uniform sampling, in the DCT domain, is then applied to coefficients of successive blocks in the compressed image in accordance with the scaling parameters. As used herein, "non-uniform" means unequal or uneven, in that all blocks are not sampled at the same rate. More specifically, as described in detail below, P blocks are sampled and transformed from a given block length to |P| according to a |P|-point IDCT, while Q blocks are sampled and transformed from a given block length to |Q| according to a |Q|-point IDCT. The non-uniformly sampled and transformed pixel domain samples are then regrouped into a predetermined block size, and transformed back to generate the DCT coefficients of the resized image. In an embodiment, the transformation can be done by applying an 8-point DCT to regrouped 8-sample blocks.

The method and system will now be described in greater detail with reference to a downsizing operation, where the image is downsized by a scaling ratio L/M. However, upsizing by a scaling ratio of M/L is equally applicable. The scaling ratio is an irreducible fractional number. For example, if downsizing the spatial resolution of an image from 464 to 320 in one dimension, then L/M=320/464=20/29, and M=29 and L=20. For the purposes of this description standard block lengths of 8 are assumed, though it is fully contemplated that a different standard unit block length could be used. Although the resized image can take an arbitrary spatial resolution in the pixel domain through the present arbitrary ratio DCT domain scaling method, the basic unit in the DCT domain is generally an 8×1 or 8×8 block depending on whether the operation is performed in one or two dimensions. To simplify the description, the image is assumed to be formed of 8×1 sample blocks in both the horizontal and vertical directions. The original image is assumed to consist of rows and columns of M blocks, and the resized image is assumed to consist of rows and columns of L blocks, though it is clear that actual rows and columns of the original and resized images can contain multiples of M and L blocks, and the method can be scaled according to the appropriate multipliers. M and L can be different in each of the horizontal and vertical directions. Resizing according to the present invention is performed sequentially each 8×1 block both horizontally and vertically, and repeated for each component (Y, U, V) channel.

Figure 7:
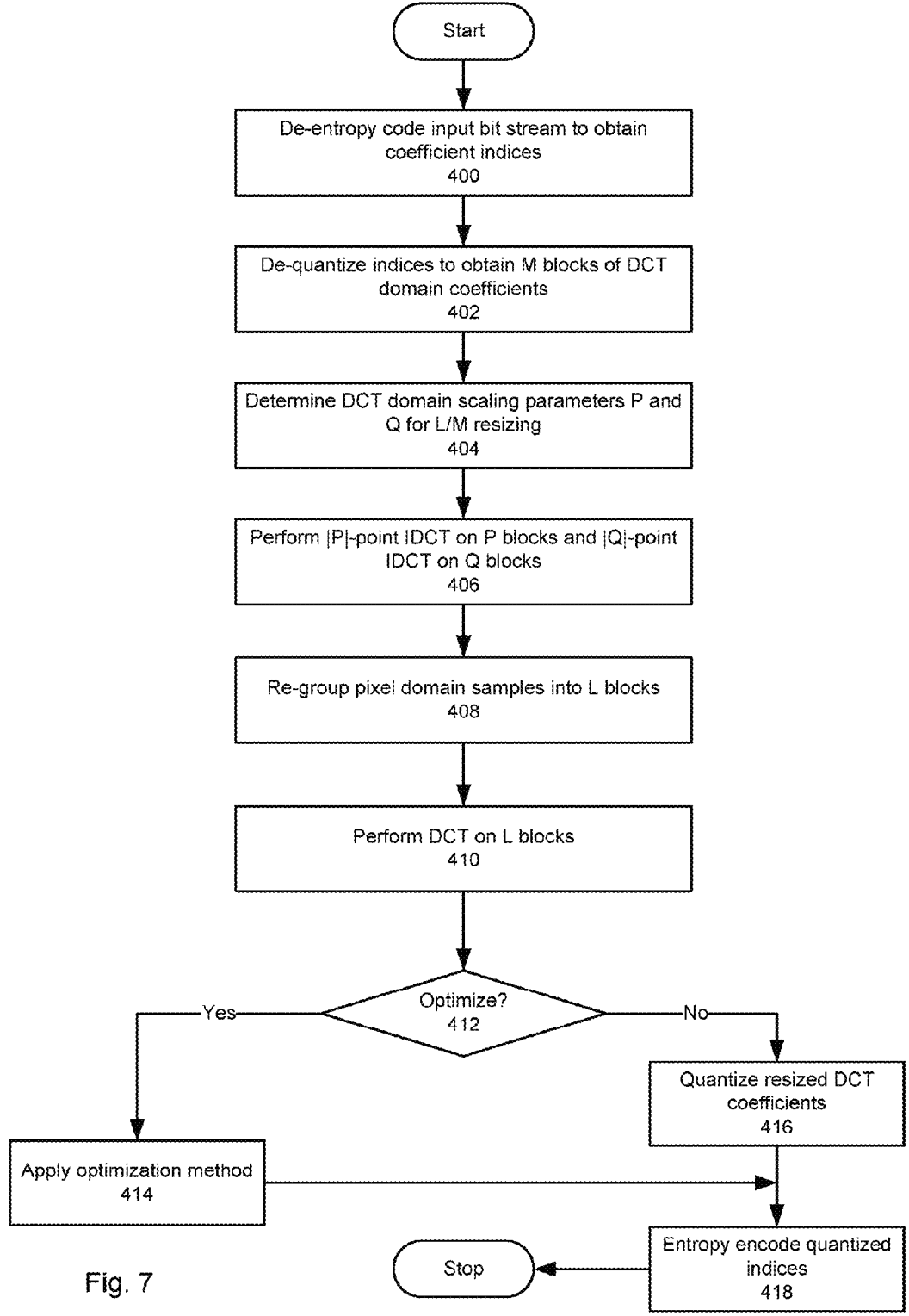
FIG. 7 is a flowchart of an embodiment of the arbitrary ratio resizing method.

Referring to FIGS. 6 and 7, the image, or the input bit stream, is first decoded by entropy decoder 322 to obtain quantized coefficient indices (step 400), which are then dequantized by dequantizer 324 to reconstruct, or reconstitute, the DCT coefficients of the compressed image, as is well-known in the art (step 402). The DCT coefficients are also referred to herein as samples. The DCT domain scaling parameters P and Q are then determined by the scaling function 326, based on L and M, the scaling ratio L/M, and the standard block length (step 404). The IDCT lengths |P| and |Q| are also determined by the scaling function 326 based on the scaling ratio and standard block length. When the standard block length is 8, IDCT lengths |P| and |Q|, and scaling parameters P and Q are calculated as follows:

$|P| = \text{ceil}(8*L/M)$ $|Q| = \text{floor}(8*L/M)$ $P = 8*L - |Q|*M$ $Q = M - P$ where L/M is an irreducible fractional number; the function ceil(x) returns the smallest integer that is greater than or equal to x; and the function floor(x) returns the largest integer that is less than or equal to x.

IDCT 328 then performs a |P|-point IDCT on P blocks of the image, and a |Q|-point IDCT on Q blocks (step 406) to downsample the image. To reduce scaling distortions, a permutation scheme can be used to determine the order in which blocks are transformed according to |P|-point and |Q|-point IDCTs. Such downsampled and transformed blocks are referred to herein as P-blocks and Q-blocks, respectively. Any permutation or interleaving scheme can be used, including pseudo-random interleaving of the P-blocks and Q-blocks. If P and Q have a common factor, the M blocks can be further divided into smaller groups according to the common factor and each smaller group can be permuted according to a desired permutation scheme. According to a first exemplary scheme, a |P|-point IDCT is performed on the first P blocks and |Q|-point IDCT is performed on the remaining Q blocks. According to a second exemplary scheme, P-blocks and Q-blocks can be interleaved until one type of block is exhausted. Interleaving can be done singly, by pairs, or by any other desired grouping. According to a third exemplary scheme, the nearest integer value R to the ratio P/Q is determined (assuming P is larger than Q), and R P-blocks are followed by one Q-block until one type of block is exhausted. If Q is larger than P, R is determined based on the ratio Q/P, and R Q-blocks are followed by one P-block.

Figure 8:
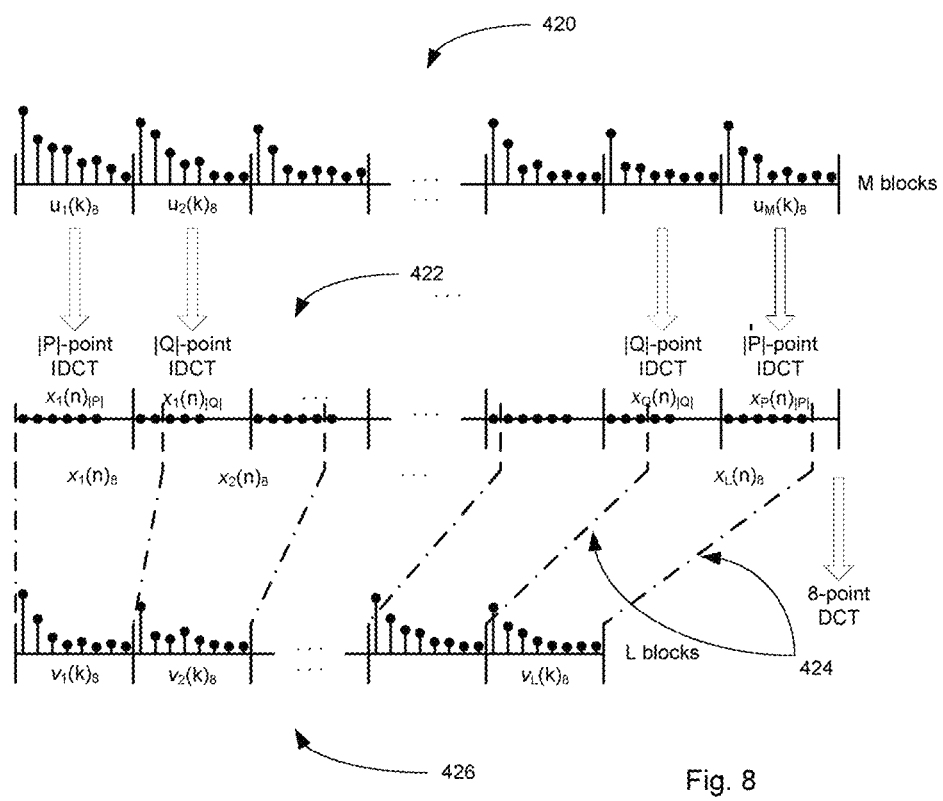
FIG. 8 is a conceptual diagram of an embodiment of an arbitrary ratio resizing method.

FIG. 8 shows conceptually how the |P|- and |Q|-point IDCT operations are performed in step 406. In this example, the original image resolution is 580×580 and the target image resolution is 400×400, thus M=29 and L=20. |P|=ceil(8*20/29)=6 and |Q|=floor(8*20/29)=5, and P=(8*20)−(5*29)=15, Q=(29−15)=14. The reconstructed DCT coefficients 420 are arranged in M 8-sample blocks $u_1(k)_8 - u_m(k)_8$. The IDCT operations are depicted in the transition from DCT coefficient blocks 420 to pixel domain sample blocks 422. Those blocks that have undergone a |P|-point IDCT, resulting in |P| samples per P-block, are labeled $x_1(n)_{|P|} - x_P(n)_{|P|}$, and those that have undergone a |Q|-point IDCT, resulting in |Q| samples per Q-block, are labeled $x_1(n)_{|Q|} - x_Q(n)_{|Q|}$. The permutation scheme used in this example is single block interleaving, as described above.

Returning to FIGS. 6 and 7, the resizing function 330 regroups the pixel domain samples into L 8-sample blocks (step 408). DCT 332 then performs an 8-point DCT on each regrouped block to generate the DCT coefficients of the resized image (step 410). If a decision is made to perform an optimization (step 412), the DCT coefficients of the resized image can then be optimally quantized (step 414) in a soft decision manner, otherwise, the DCT coefficients can be regularly quantized (step 416) in a hard decision manner at quantizer 334 prior to entropy coding (step 418) at entropy coder 336. FIG. 8 again conceptually shows the resampling and regrouping steps 406 and 408. The regrouping of the pixel domain samples into 8-sample blocks $x_1(n)_8 - x_L(n)_8$ is shown conceptually by the hashed lines 424. The 8-point DCT operation is depicted by the transition from the regrouped pixel domain samples 424 to the DCT coefficients of the resized image 426, labeled as blocks $v_1(k)_8 - v_L(k)_8$. Thus, in this example a 6-point IDCT is required for 15 blocks and 5-point IDCT is required for the remaining 14 blocks. All the DCT operations on the regrouped 20 blocks are of length 8.

To simplify implementation the original image can be scaled down by 1:8 prior implementing the present resizing method, if 8*L/M<1. This can be easily implemented by performing an 8-point DCT on the DC coefficients. This 1:8 resizing process can be repeated until 8*L/M≧1.

Since both the JPEG standard and most video standards permit different sampling ratios for the luminance component Y and chrominance components U and V, steps can also be taken to prevent the possible displacement of, or loss of synchronization between, the luminance and chrominance components. To avoid such displacement, the following three criteria should be kept in mind. First, the numbers of blocks of each component of the original image used for the scaling (both in the horizontal and vertical directions) should be made consistent with the component sampling ratio. For example, for a 408×408 JPEG image with 4:2:0 sampling ratio, each block row has 51 luminance blocks and 26 chrominance blocks, and the sampling ratio between the components is 2:1. Thus, instead of using 51 luminance blocks and 26 chrominance blocks for scaling purposes, 50 luminance blocks and 25 chrominance blocks should be used for scaling to maintain the sampling ratio of the original image. Similarly, the target numbers of blocks of different components in the resized image should also be kept consistent with the component sampling ratio. For example, resizing of a 408×408 JPEG image to 312×312 would result in 39 luminance blocks and 20 chrominance blocks in each block row. However, to maintain the required 2:1 sampling ratio, the target number of blocks of the resized image should be set to 40 and 20 for the luminance and chrominance components, respectively. Adjusting the original or target number of blocks can be achieved by discarding samples or zero-padding the sample streams, as appropriate.

Finally, if the sampling rates of the luminance component and chrominance components of the original image differ, the calculated M, L, P and Q for the component sampled at the higher rate (i.e. the luminance component) should be increased accordingly to prevent color displacement in the resized image. For example, if resizing a 4:2:0 JPEG image from 408×408 to 312×312, M, L, P and Q, as calculated above, are respectively 5, 4, 2, and 3 for both the luminance component and the chrominance components. To prevent color displacement, the values of M, L, P and Q for the luminance component (i.e., the component sampled at the higher rate) should be doubled during the resizing operations. In other words, for the luminance component, twice as many blocks will be downsampled and resampled as a processing unit. The IDCT lengths |P| and |Q| remain unchanged. Thus, the computational complexity does not increase.

As will be appreciated, for practical applications, the present resizing method in the DCT domain only requires the implementation of N-point IDCT operations, where N is from 2 to 8, and an 8-point DCT. The matrices required for these implementations are well-known and readily available, such as through open source resources such as JPEGclub.org. Further complexity reduction is achievable by making use of the orthogonality and symmetry properties of the DCT for each N-point IDCT for N≦8 and 8-point DCT combinations, as described in Dugad, R., Ahuja, N., "A fast scheme for image size change in the compressed domain", *IEEE Trans. Circuits Syst. Video Technol.*, vol. 11, no. 4, April 2001, the contents of which are incorporated herein by reference in their entirety.

Compared with pixel domain scaling methods, the present method reduces the complexity for the full DCT/IDCT operations, eliminates low-pass filtering in the pixel domain, and eliminates any necessary color space conversion. Testing on actual JPEG images show that overall, the present method needs only half the time consumed by its pixel domain counterpart to resize a JPEG image to a downsized JPEG image, and achieves better visual quality. Compared to previous arbitrary ratio resizing methods, such as described in Park, Y., Park, H., "Arbitrary-ratio image resizing using fast DCT of composite length for DCT-based Transcoder", *IEEE Trans. Image Process.*, vol. 15, no. 2, February 2006 (hereinafter Park), the present method requires far less complex IDCT and DCT operations, thus significantly reducing the overall computational complexity. In Park's arbitrary ratio resizing method (CASE I), the restored DCT coefficient blocks are uniformly upsized by zero-padding to form L-sample blocks. An L-point IDCT is then performed on each block, resulting in M L-point blocks. The M blocks are regrouped into L blocks, and an M-point DCT is performed on each block. The high frequency coefficients are then discarded to arrive at an L 8-point blocks in the DCT domain. To provide arbitrary ratio resizing for practical applications, Park must implement fast IDCT and DCT algorithms for all possible lengths L and M. This is non-trivial, and adds significant complexity to practical applications.

A comparison between the present method and the method proposed by Park follows. One of the advantages of the present method is the significantly reduced computational complexity associated with the IDCT and DCT scaling operations, which facilitates practical application of the method and system. The actual computational complexity reduction between the present method and that described by Park depends on the actual scaling ratio. Table I compares the execution time consumed by the DCT domain scaling operations of these two methods where both DCT and IDCT are directly implemented based on DCT/IDCT equations while any fast DCT/IDCT implementation could reduce the complexity for both methods proportionally. It can be seen that the present method dramatically reduces the complexity when compared to Park. The execution time for the DCT operations of the present method is only proportional to the dimension of the resized image. On the other hand, Park's method depends on the values of M and L, which in turn depend on the dimension of the original and resized images. The larger the values of M and L, the more computationally complex is Park's method. Cropping the edges of the source image may reduce the values of M and L for certain cases, but cropping the source image too much is generally not acceptable for most applications.

TABLE I

Execution time in seconds for the DCT domain scaling operations of Park and the present method for 512 × 512 gray-level Lena on a Pentium PC

| | Target dimension | | | | |
|---|---|---|---|---|---|
| | 152 × 152 | 200 × 200 | 304 × 304 | 352 × 352 | 400 × 400 |
| Value of M | 64 | 64 | 32 | 16 | 32 |
| Value of L | 19 | 25 | 19 | 11 | 25 |
| Park's method | 1.15 | 2.01 | 1.45 | 0.65 | 2.60 |
| Present method | 0.06 | 0.10 | 0.22 | 0.28 | 0.35 |

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of downsizing a compressed image in the discrete cosine transform (DCT) domain by an arbitrary scaling ratio L/M, where L is a target number of blocks and M is an original number of blocks, the method comprising:

performing a non-uniform sampling of DCT coefficients of successive blocks in the compressed image, each block having a DCT block length, by sampling P blocks at a first inverse discrete cosine transform (IDCT) length |P| and sampling Q blocks at a second IDCT length |Q|; where |P| and |Q| are integer functions of the DCT block length and the arbitrary scaling ratio L/M, and where first scaling parameter P is a difference between a product of the DCT block length and L and a product of |Q| and M, and second scaling parameter Q is a difference between M and P;

performing a |P|-point IDCT on P blocks, and performing a |Q|-point IDCT on Q blocks, to provide non-uniformly sampled pixel domain samples;

concatenating the non-uniformly sampled pixel domain samples into blocks; and performing a DCT operation on each of the concatenated blocks.

2. The method of claim 1, further comprising repeating performing the non-uniform sampling of the DCT coefficients, concatenating the non-uniformly sampled pixel domain samples, and performing the DCT operation for each component of the compressed image.

3. The method of claim 2, further comprising maintaining synchronization between components compressed at different sampling rates.

4. The method of claim 2, further comprising maintaining consistency between a sampling ratio of components in the compressed image and a sampling ratio of components in a resized image.

5. The method of claim 1, further comprising repeating performing the non-uniform sampling of the DCT coefficients, concatenating the non-uniformly sampled pixel domain samples, and performing the DCT operation for each row of blocks in the compressed image.

6. The method of claim 1, further comprising repeating performing the non-uniform sampling of the DCT coefficients, concatenating the non-uniformly sampled pixel domain samples, and performing the DCT operation for each column of blocks in the compressed image.

7. The method of claim 1, wherein |P| is a closest integer larger than or equal to a product of the DCT block length and the scaling ratio, and wherein |Q| is a closest integer smaller than or equal to a product of the DCT block length and the scaling ratio.

8. The method of claim 1, wherein performing the non-uniform sampling of DCT coefficients comprises:

performing non-uniform sampling on a number of blocks proportional to P; and performing non-uniform sampling on a number of blocks proportional to Q;

and wherein performing the |P|-point IDCT and performing the |Q|-point IDCT comprises performing a |P|-point IDCT on the number of blocks proportional to P, and performing a |Q|-point IDCT on the number of blocks proportional to Q.

9. The method of claim 1, wherein performing the non-uniform sampling of DCT coefficients comprises sampling the P blocks at the length |P| and sampling the Q blocks at the length |Q| according to a predetermined permutation scheme.

10. The method of claim 1, wherein concatenating the non-uniformly sampled pixel domain samples comprises regrouping the non-uniformly sampled pixel domain samples into blocks of a predetermined length.

11. The method of claim 1, further comprising partially decoding the compressed image to restore the DCT coefficients.

12. The method of claim 11, wherein partially decoding the compressed image comprises:

entropy decoding the compressed image to provide quantized coefficient indices; and dequantizing the quantized coefficient indices to restore the DCT coefficients.

13. The method of claim 1, wherein performing a DCT operation on each of the concatenated blocks provides DCT coefficient blocks of a resized image, the method further comprising:

quantizing the DCT coefficient blocks of the resized image; and entropy coding the quantized DCT coefficient blocks to provide a resized compressed image.

14. The method of claim 1, further comprising performing the non-uniform sampling and performing the DCT operation for each color component of the compressed image.

15. A resizing transcoder for arbitrary ratio resizing of a compressed image in the discrete cosine transform (DCT) domain by an arbitrary scaling ratio L/M, where L is a target number of blocks and M is an original number of blocks, the transcoder comprising:

a processor configured to:

decode components of a compressed image to provide quantized coefficient indices for each component;

dequantize the quantized coefficient indices to reconstitute DCT coefficients for each component;

perform a non-uniform sampling of DCT coefficients of successive blocks in the compressed image, each block having a DCT block length, by sampling P blocks at a first inverse discrete cosine transform (IDCT) length |P| and sampling Q blocks at a second IDCT length |Q|; where |P| and |Q| are integer functions of the DCT block length and the arbitrary scaling ratio L/M, and where first scaling parameter P is a difference between a product of the DCT block length and L and a product of |Q| and M, and second scaling parameter Q is a difference between M and P;

perform a |P|-point IDCT on P blocks, and perform a |Q|-point IDCT on Q blocks, to provide non-uniformly sampled pixel domain samples;

concatenate the non-uniformly sampled pixel domain samples into blocks;

perform a DCT operation on each of the concatenated blocks to provide DCT coefficient blocks of a resized image; and quantize the DCT coefficient blocks of the resized image; and an entropy coder to entropy code the quantized DCT coefficient blocks to provide a resized compressed image.

16. The transcoder of claim 15, wherein the processor is further configured to maintain synchronization between components compressed at different sampling rates.

17. The transcoder of claim 15, wherein the processor is further configured to maintain consistency between a sampling ratio of components in the compressed image and a sampling ratio of components in the resized image.

18. The transcoder of claim 15, wherein the processor is further configured to repeat performing the non-uniform sampling of the DCT coefficients, concatenate the non-uniformly sampled pixel domain samples, and perform the DCT operation for each row of blocks in the compressed image.

19. The transcoder of claim 15, wherein the processor is further configured to repeat performing the non-uniform sampling of the DCT coefficients, concatenating the non-uniformly sampled pixel domain samples, and performing the DCT operation for each column of blocks in the compressed image.

20. The transcoder of claim 15, wherein the processor is further configured to perform the non-uniform sampling and perform the DCT operation for each color component of the compressed image.

* * * * *